May 10, 1938.   R. T. HAMEL   2,116,890
BLADED IMPLEMENT
Filed Jan. 11, 1936
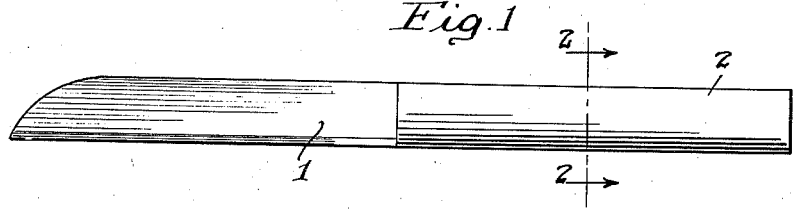
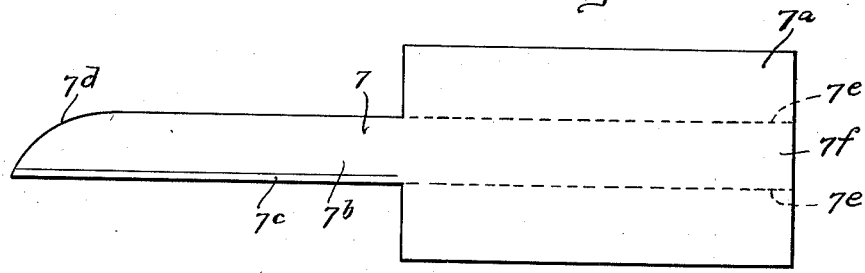
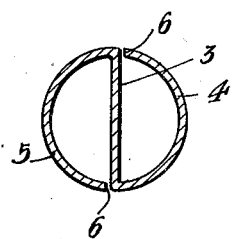
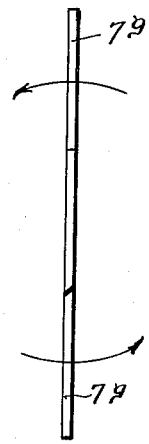
INVENTOR.
Richard T. Hamel
BY Lyon & Lyon
ATTORNEYS Patented May 10, 1938

2,116,890

UNITED STATES PATENT OFFICE 2,116,890

BLADED IMPLEMENT

Richard T. Hamel, Beverly Hills, Calif.

Application January 11, 1936, Serial No. 58,723

5 Claims. (Cl. 30—165)

This invention relates to a bladed implement, and while the invention may be applied to any implement having a blade to be used for any particular purpose, it is intended particularly to be applied in the construction of small knives, such as used for paring knives or kitchen knives, or for any other purpose where a knife with a short blade rigidly secured to a handle can be employed to advantage. However, the invention would be applicable in the construction of trowels, or any other bladed instruments.

One of the difficulties arising in the construction of bladed instruments such as knives, or other bladed tools, is that a handle must be provided, to which the tang of the blade is secured. This handle is usually of wood, and where the tool is to have an attractive finish, and also to prevent the tang from tending to split the handle, it is common to provide a ferrule surrounding and reinforcing the end of the handle that carries the tank. Heretofore, tools such as knives, have had handles which were of metal and integral with the blade or working part of the tool, but such handles except in the case of some forms of planting trowels, have not been of a substantially round form, which could be grasped and held comfortably in one's hand. It is true that trowels have been formed where the handle was integral with the blade of the trowel, but in that type of trowel it is necessary to cut down the metal to a comparatively narrow tongue at the point where the trowel connects to the handle portion of the blank; and trowels of this type are therefore relatively weak, and tend to break at this tongue that connects with the handle.

One of the objects of this invention is to provide a hand implement having a blade or working portion, and having a substantially round handle formed integrally with the blade or working portion of the tool, and in which it is possible to provide the tool with a substantially round handle without reducing the section of metal where the blade or working part of the tool joins the handle.

A further object of the invention is to produce a bladed tool having a substantially round handle capable of being formed with a blank of very simple form.

Further objects of the invention will appear hereinafter.

The invention consists in the novel parts and combination of parts to be described hereinafter, all of which contribute to produce an efficient bladed implement.

A preferred embodiment of the invention is described in the following specification, while the broad scope of the invention is pointed out in the appended claims.

In the drawing:

Fig. 1 is a side elevation illustrating my invention as applied to a short-bladed knife such as could be employed for many purposes, but particularly for the purposes of a knitchen knife.

Fig. 2 is a vertical section on the line 2—2 of Fig. 1, particularly illustrating the details of the handle of the knife.

Fig. 3 is a plan of a blank of simple form, from which the knife illustrated in Figs. 1 and 2 can be formed.

Fig. 4 is an end view of the blank viewed from the end of the blade, and diagrammatically illustrating the way the blank is bent up to form the handle.

Before proceeding to a more detailed description of the invention as applied to a small knife, it should be stated that although I have described the invention as applied to a knife, it should be understood that it can be applied to substantially any tool having a blade, and in which it is desirable to form the blade and the handle integral with each other.

Referring more particularly to the parts of the knife illustrated in the drawing, and embodying my invention, 1 indicates the blade of the knife, and 2 indicates the handle. The handle as illustrated in Fig. 2, comprises a shank 3 that is preferably in line with the plane of the blade. In other words, the shank 3 is of plate-form, and from the end of this shank the blade 1 extends as an integral part. The handle 2 may be formed of half-round or semi-cylindrical shape, but is preferably of cylindrical form, and in this case comprises two semi-cylindrical shells 4 and 5 integral with the opposite edges of the shank 3 and bent around so that the extremity or edge 6 of each half-round shell lies substantially in the plane of the shank (see Fig. 2). An implement having the characteristics illustrated in Figs. 1 and 2, can be formed from a blank 7 of very simple form. This blank has a body 7a of substantially rectangular form, from one end of which the blade 7b extends, the axis of the blade being preferably parallel with, or coaxial with, the longitudinal axis of the rectangular body 7a. This blank, of course, is adapted to be stamped out from sheet steel or other suitable metal, and when it is stamped out a bevel edge 7c may be formed on the blade 7b. Also, if desired, the rear edge of the blade 7b of the blank can be rounded off at the end of the blade, as indicated at 7d.

In Fig. 3 the dash and dot lines 7e are extensions or projections of the back and forward edges of the blade 7b of the blank. That portion 7f of the body between the line 7e is to form the shank 3 of the finished knife, and in forming the knife the material or wing 7g at each side of the portion 7a, is bent round to form a semi-cylindrical shell as indicated in Fig. 4. In referring to this view, which corresponds to Fig. 2, the upper wing or extension 7g is bent to the left as indicated by the arrow, and is formed up into semi-cylindrical form with its outer edge resting at the point 6 near the plane of the shank 3. The lower wing 7g, as indicated in Fig. 4, is folded upwardly as indicated by the arrow, and formed up into semi-cylindrical shell form so that its upper edge rests on the other side of the shank of the knife, but near the plane of the shank. By reason of the fact that these blanks can be stamped out very inexpensively in suitable sheet metal, and by reason of the simple operation in forming the handle for the knife, it will be evident that this knife can be manufactured very inexpensively. Furthermore, the handle is a stout handle because it presents a shank which may be regarded as an extension of the blade in the plane of the blade, with the full section of metal of the blade extending into the shank.

It is understood that the embodiment of the invention described herein is only one of the many embodiments this invention may take, and I do not wish to be limited in the practice of the invention, nor in the claims, to the particular embodiment set forth.

What I claim is:

1. A bladed implement having a shank in the form of an elongated substantially flat plate, and having an integral blade extending from one end thereof, said shank having a lateral extension on each side thereof, each of said lateral extensions being bent outwardly from the plane of the shank to form a shell covering the adjacent face of the shank, the outer edges of said bent extensions substantially abutting the side faces of the shank and cooperating to form a tubular handle for the implement.

2. A bladed implement having a shank in the form of an elongated plate, and having an integral blade extending from one end thereof, said shank having a lateral extension on one side edge thereof, said lateral extension being bent around in a general circumferential direction with respect to the axis of the handle, said shank having a second lateral extension at the other side edge thereof, said second lateral extension being bent around in the same general circumferential direction as the other lateral extension, said lateral extensions cooperating to form a handle for the implement.

3. A bladed implement having a shank in the form of an elongated plate, and having an integral blade extending from one end thereof, said shank having a lateral extension on one side edge thereof, said lateral extension being bent around in a general circumferential direction with respect to the axis of the handle, said shank having a second lateral extension at the other side edge thereof, said second lateral extension being bent around in the same general circumferential direction as the other lateral extension, said lateral extensions cooperating to form a handle for the implement, the longitudinal edges of said lateral extensions substantially abutting against the opposite side faces of the shank.

4. A bladed implement having a shank in the form of an elongated plate, and having an integral blade extending from one end thereof, said shank having a lateral extension on one side edge thereof, said lateral extension being bent around in a general circumferential direction with respect to the axis of the handle, said shank having a second lateral extension at the other side edge thereof, said lateral extension being bent around in the same general circumferential direction as the other lateral extension, said lateral extensions cooperating to form a handle for the implement, the longitudinal edges of said lateral extensions substantially abutting against the opposite side faces of the shank, and said shank lying in the same plane as the blade of the implement.

5. A bladed implement having a shank in the form of an elongated substantially flat plate, and having an integral blade extending from one end thereof, said shank having a lateral extension on each side edge thereof, said lateral extensions being bent outwardly from the plane of the shank in opposite directions and covering the adjacent side of the shank, said bent extensions substantially abutting each other and cooperating to form a tubular handle for the implement.

RICHARD T. HAMEL.